(12) United States Patent
Howard et al.

(10) Patent No.: US 9,340,418 B2
(45) Date of Patent: May 17, 2016

(54) METHOD FOR DISPERSING AND SEPARATING NANOTUBES WITH AN ELECTRONIC LIQUID

(75) Inventors: Christopher Howard, London (GB); Neal Skipper, London (GB); Milo Shaffer, London (GB); Sian Fogden, London (GB)

(73) Assignee: UCL Business PLC, London (GB)

( * ) Notice: Subject to any disclaimer, the term of this patent is extended or adjusted under 35 U.S.C. 154(b) by 305 days.

(21) Appl. No.: 13/001,835

(22) PCT Filed: Jul. 3, 2009

(86) PCT No.: PCT/GB2009/001661
§ 371 (c)(1),
(2), (4) Date: May 31, 2011

(87) PCT Pub. No.: WO2010/001128
PCT Pub. Date: Jan. 7, 2010

(65) Prior Publication Data
US 2011/0287258 A1     Nov. 24, 2011

(30) Foreign Application Priority Data

Jul. 3, 2008 (GB) .................................. 0812328.3
Dec. 10, 2008 (GB) .................................. 0822526.0

(51) Int. Cl.
*B01F 3/12*     (2006.01)
*B82Y 30/00*    (2011.01)
(Continued)

(52) U.S. Cl.
CPC ............. *B82Y 30/00* (2013.01); *B01F 15/0441* (2013.01); *B01J 2/30* (2013.01); *B82Y 40/00* (2013.01); *C01B 31/0266* (2013.01);
(Continued)

(58) Field of Classification Search
CPC .................... B01F 15/0441; B01F 2003/1257; B01F 2003/1278; B82Y 40/00; B01J 2/006; B01J 2/30
USPC .................... 241/1, 16, 19, 20, 24.1; 428/402; 252/363.5; 977/845
See application file for complete search history.

(56) References Cited

U.S. PATENT DOCUMENTS 3,454,484 A  7/1969  King, Jr. et al.
3,655,525 A  4/1972  Childs
(Continued)

FOREIGN PATENT DOCUMENTS

JP  6/228824    11/1985
JP  2000-072422  3/2000
(Continued)

OTHER PUBLICATIONS

Duesberg et al., Chromatographic size separation of single wall carbon nanotubes, Appl. Phys. A 67, 117-119 (1998).*
(Continued)

*Primary Examiner* — Holly Le
(74) *Attorney, Agent, or Firm* — Baker & Hostetler LLP

(57) ABSTRACT

A method for dispersing nanotubes, comprising contacting the nanotubes with an electronic liquid comprising a metal and an amine solvent, a solution of dispersed nanotubes, comprising individual nanotubes at a concentration of greater than about 0.01 mgml$^{-1}$ and a solvent and a nanotube crystal comprising a close packed array of nanotubes, wherein the crystal has a thickness of 100 nm or more are described.

21 Claims, 4 Drawing Sheets

(51) Int. Cl.
*B01F 15/04* (2006.01)
*B01J 2/30* (2006.01)
*B82Y 40/00* (2011.01)
*C01B 31/02* (2006.01)

(52) U.S. Cl.
CPC .... *C01B 31/0273* (2013.01); *B01F 2003/1257* (2013.01); *B01F 2003/1278* (2013.01); *C01B 2202/02* (2013.01); *C01B 2202/22* (2013.01); *C01B 2202/34* (2013.01); *Y10T 428/2982* (2015.01)

(56) References Cited

U.S. PATENT DOCUMENTS

| | | |
|---|---|---|
| 2003/0077515 A1 | 4/2003 | Chen et al. |
| 2003/0102222 A1 | 6/2003 | Zhou et al. |
| 2003/0168385 A1 | 9/2003 | Papadimitrakopoulos |
| 2004/0040834 A1 | 3/2004 | Smalley et al. |
| 2004/0071624 A1 | 4/2004 | Tour et al. |
| 2005/0042162 A1 | 2/2005 | Resasco et al. |
| 2005/0121309 A1 | 6/2005 | Chhowalla et al. |
| 2006/0063464 A1 | 3/2006 | Kang et al. |
| 2006/0192475 A1 | 8/2006 | Lee et al. |
| 2007/0098620 A1* | 5/2007 | Khabashesku et al. .... 423/447.1 |
| 2007/0189954 A1 | 8/2007 | Penicaud et al. |
| 2007/0196262 A1* | 8/2007 | Billups et al. ............. 423/445 R |
| 2007/0224084 A1* | 9/2007 | Holmes et al. ............... 422/68.1 |
| 2008/0099339 A1 | 5/2008 | Zhou et al. |
| 2008/0245671 A1 | 10/2008 | Balagopal et al. |
| 2008/0271606 A1 | 11/2008 | Holmes et al. |
| 2009/0253590 A1 | 10/2009 | Murakoshi et al. |
| 2009/0291041 A1 | 11/2009 | Afzali-Ardakani et al. |
| 2009/0297846 A1 | 12/2009 | Hata et al. |
| 2010/0044230 A1 | 2/2010 | Papadimitrakopoulos et al. |
| 2011/0124790 A1 | 5/2011 | Penicaud |
| 2011/0287258 A1* | 11/2011 | Howard ................. B82Y 30/00 428/402 |

FOREIGN PATENT DOCUMENTS

| | | |
|---|---|---|
| JP | 2000/724222 | 3/2000 |
| JP | 2000/347478 | 12/2000 |
| JP | 2001/319560 | 11/2001 |
| JP | 2003/212526 | 7/2003 |
| JP | 2004/043269 | 2/2004 |
| JP | 2005/015243 | 1/2005 |
| JP | 2005/104750 | 4/2005 |
| JP | 2005-519201 | 6/2005 |
| JP | 2006/064693 | 3/2006 |
| JP | 2007/520326 | 7/2007 |
| JP | 2008/055375 | 3/2008 |
| JP | 2009/196840 | 9/2009 |
| WO | WO 03/053846 | 7/2003 |
| WO | WO 03/075372 | 9/2003 |
| WO | WO 03/084869 | 10/2003 |
| WO | WO 2005/014889 | 2/2005 |
| WO | WO 2005/019096 | 3/2005 |
| WO | WO 2008/054411 | 5/2005 |
| WO | WO 2005/090233 | 9/2005 |
| WO | WO 2006/028704 | 3/2006 |
| WO | WO 2007/078082 | 7/2007 |
| WO | WO 2007/101907 | 9/2007 |
| WO | WO 2007/103356 | 9/2007 |
| WO | WO 2007/130869 | 11/2007 |
| WO | WO 2008/111735 | 9/2008 |
| WO | WO 2008/140623 | 11/2008 |
| WO | WO 2010/001125 | 1/2010 |
| WO | WO 2010/001128 | 1/2010 |
| WO | WO 2011/124888 | 10/2011 |

OTHER PUBLICATIONS

Howard et al., Formation of giant salvation shells around fulleride anions in liquid ammonia, J.A.C.S., vol. 126, No. 41, 13228-13229, Jun. 2004.*

Duclaux, Review of the doping of carbon nanotubes (multiwalled and single-walled), Carbon, vol. 40, Issue 10, Aug. 2002, 1751-1764 (DOI:10.1016/S0008-6223(02)00043-X).*

Arnold et al., "Sorting carbon nanotubes by electronic structure using density differentiation", Nature Nanotechnology, Oct. 2006, 1(1), 60-65.

Banerjee et al., "Demonstration of Diameter-Selective Reactivity in the Sidewall Ozonation of SWNT's by Resonance Raman Spectroscopy", Nano Letters, May 2004, 4(8), 1445-1450.

Bauer et al., "Measurements of single-wall nanotube dispersion by size exclusion chromatography", J. Phys. Chem. C, 2007, 111, 17914-17918.

Baughman et al., "Carbon Nanotubes—the Route Toward Applications", Science, Aug. 2002, 297(5582), 787-792.

Boccaccini et al., "Electrophoretic deposition of carbon nanotubes", Carbon, Dec. 2006, 44(15), 3149-3160.

Chen et al., "Solution properties of single-walled carbon nanotubes", Science, 1998, 282, 95-98.

Coleman et al., "Towards Solutions of Single-Walled Carbon Nanotubes in Common Solvents", Adv. Mater, May 2008, 20(10), 1876-1881.

Dresselhaus et al., "Raman spectroscopy of carbon nanotubes", Physics Reports, 2005, 409, 47-99.

Ericson et al., "Macroscopic, Neat, Single-Walled Carbon Nanotube Fibers", Science, Sep. 2004, 1447, 1446-1451.

Fagan et al., "Comparative Measures of Single-Wall Carbon Nanotube Dispersion". J. Phys. Chem. B, Sep. 14, 2006, 110, 23801-23805.

Giordani et al., "Fabrication of stable dispersions containing up to 70% individual carbon nanotubes in a common organic solvent", Phys Stat Solidi B, Apr. 2006, 243(13), 3058-3062.

Girishkumar et al., "Carbon Nanostructures in Portable Fuel Cells: Single-Walled Carbon Nanotube Electrodes for Methanol Oxidation and Oxygen Reduction", J. Phys. Chem. B, Jul. 2004, 108(52), 19960-19966.

Gu et al., "In situ Raman studies on lithiated single-wall cabon nanotubes in liquid ammonia", Chem. Phys, Letts 410, May 2005, 4-6, 467-470.

Hough et al., "Structure of Semidilute Single-Wall Carbon Nanotube Suspensions and Gels", Nano Letters, Sep. 2006, 6(2), 313-317.

Howard et al., "Formation of giant salvation shells around fulleride anions in liquid ammonia", J. Am. Chem. Soc., Jun. 2004, 126(41), 13228-13229.

Jorio, "Characterizing carbon nanotube samples with resonance Raman scattering", New Phys., A, Oct. 2003, 5, 139.1-139.17.

Kavan et al., "Electrochemical Tuning of Electronic Structure of Single-Walled Carbon Nanotubes; In-situ Raman and Vis-NIR Study", J. Phys. Chem. B, 2001, 105(44), 10764-10771.

Kim et al., "Selective Functionalization and Free Solution Electrophoresis of Single-Walled Carbon Nanotubes: Separate Enrichment of Metallic and Semiconducting SWNT", Chemistry of Materials, Aug. 2007, 19(7), 1571-1576.

Krupke et al., "Separation of Metallic from Semiconducting Single-Walled Carbon Nanotubes", Science 300, Jul. 2003, 301, 344-347.

Liang et al., "A convenient route to functionalized carbon nanotubes", Nano Letters Am. Chem. Soc. USA, Apr. 2004, 4(7), 1257-1260.

Liang et al., "Structure of dodecylated single-walled carbon nanotubes", J. Am. Chem. Soc., May 2005, 127(40), 13941-13948.

Maeda, "Large-Scale Separation of Metallic and Semiconducting Single-Walled Carbon Nanotubes", J. Am. Chem. Soc., Mar. 2005, 127(29), 10287-10290.

O'Connell et al., "Band Gap Fluorescence from Individual Single-Walled Carbon Nanotubes", Science, Jul. 2002, 297, 593-596.

Okazaki et al., "Absolute potential of the Fermi level of isolated single-walled carbon nanotubes", Phy Rev, B, 2003, 68(3), 035434-1 to 6.

Pacios et al., "Electrochemical behaviour of rigid carbon nanotube composite electrodes", J. Electranalytical Chem, Jul. 15, 2008, 619-620, 117-124.

Patterson, "The Scherrer Formula for X-Ray Particle Size Determination", Phys. Rev., Jul. 1939, 56(10), 978-982.

(56) References Cited

OTHER PUBLICATIONS

Peng et al., "Optically active single-walled carbon nanotubes", Nature Nanotechnology, 2007, 2(6), 361-365.
Penicaud et al., "Spontaneous Dissolution of a Single-Wall Carbon Nanotube Salt", J. Am. Chem. Soc., 2005, 127, 8-9.
Prato et al., "Soluble Carbon Nanotubes", Chem. Eur. J., 2003, 9(17), 4000-4008.
Ramesh et al., "Dissolution of Pristine Single Walled Carbon Nanotubes in Superacides by Direct Protonation", J. Phys. Chem. Soc., B, 2004, 108(26), 8794-8798.
Rols et al., "Diffraction by finite-size crystalline bundles of single wall nanotubes", Eur. Phys. J., B, 1999, 10, 263-270.
Stephenson et al., "Highly Functionalized and soluble multi-walled carbon nanotubes by reductive alkylation and arylation: The billups reaction", Chemistry of Materials, Apr. 2006, 18(19), 4658-4661.
Strano et al., "Electronic Structure Control of Single-Walled Carbon Nanotube Functionalization", Science, Sep. 2003, 301, 1519-1523.
Sun et al.,"Axial Young's modulus prediction of single-walled carbon nanotube arrays with diam", App. Phys. Lett, 87, May 2005, 193101-193101-3.
Wang et al., "Processing and property investigation of single-walled carbon nanotube (SWNT) buckypaper/epoxy resin matrix nanocomposites", Composites Part A: Applied Science and Manufacturing, 2004, 1225-1232.
Whitten et al., "Mechanical properties of carbon nanotube paper in ionic liquid and aqueous electrolytes", Carbon, Aug. 2005, 43(9), 1891-1896.
Wunderlich et al., "Preferred functionalization of metallic and small-diameter single walled carbon nanotubes via reductive alkylation", J. Mat. Chem., The Royal Society of Chemistry, Oct. 2008, 18, 1493-1497.
Yan et al., "Individually dispersing single-walled carbon nanotubes with novel neutral pH water-soluble chitosan derivatives", J. Phys. Chem C, 2008, 112(20), 7579-7587.
Zheng et al., "Enrichment of single chirality carbon nanotubes", J. Am. Chem. Soc., May 2007, 129(19), 6084-6085.
Zheng et al., "Structure-Based Carbon Nanotube Sorting by Sequence-Dependent DNA Assembly", Science, 2003, 302, 1545-1548.
Hilding et al., "Dispersion of Carbon Nanotubes in Liquids", Journal of Dispersion Science and Technology, 2003, 24(1), 41 pages.
Pekker et al., "Hydrogenation of Carbon Nanotubes and Graphite in Liquid Ammonia", J. Phys. Chem. B, 2001, 105, 7938-7943.
Li et al., "Highly-Ordered Carbon Nanotube Arrays for Electronics Applications", Applied Physics Letters, Jul. 19, 1999, 75(3), 367-369.
Mathur et al., "Optical Characterization of Single Walled Carbon Nanotubes Dispersed in Sodium Cholate and Sodium Dodecyl Sulfate", $2^{nd}$ 2008 IEEE International Nanoelectronics Conference, 2008, 968-971.
Qiu et al., "Preparation and Charaterization of Amphiphilic Multi-Walled Carbon Nanotubes", Journal of Nanopart Res, 2008, 10, 659-663.
Ferrari et al., "Interpreatation of Raman spectra of disordered and amorphous carbon", Physical Review B, May 15, 2000, 14095-14107.
Kraus, "Solutions of Metals in Non-Metallic Solvents. VI. The Conductance of the Alkali Metals in Liquid Ammonia", Journal of the American Chemical Society, Apr. 1921, vol. 43, Issue 4, 749-770.
Tasis et al., "Soluble Carbon Nanotubes", Chemistry, A European Journal, 2003, 9(17), 4000-4008.
Duesberg et al., "Chromatographic Size Separation of Single/Wall Carbon Nanotubes", Applied Physics A Materials Science & Processing, Jul. 1998, 67(1), 117-119.
Wang, "Solution Manipulation of Single-Walled Carbon Nanotubes and Their Applications in Electrochemistry", College of Arts and Sciences of Ohio University, 2009, 153 pages.

* cited by examiner

METHOD FOR DISPERSING AND SEPARATING NANOTUBES WITH AN ELECTRONIC LIQUID

CROSS-REFERENCE TO RELATED APPLICATIONS

This application is the National Stage of International Application No. PCT/GB2009/001661 filed Jul. 3, 2009, which claims the benefit of Great Britain application number 0812328.3, filed Jul. 3, 2008, and Great Britain application number 0822526.0, filed Dec. 10, 2008, the disclosures of which are incorporated herein by reference in their entirety.

The present invention relates to methods for dispersing nanotubes to create solutions comprising a high concentration of individual, charged nanotubes. The methods may include further separation steps wherein the dispersed nanotubes are separated by diameter, structure and electronic character, to produce sorted or fractionated material and solutions.

Nanoscaled carbon materials are of great technical and scientific interest. Carbon blacks have been known for a long time but have poorly defined structures. Recently, new classes of more perfect carbon nanostructures have been developed, including fullerenes and nanotubes. The most famous example of a fullerene is $C_{60}$, a pure carbon molecule with a specific symmetric and approximately spherical structure. The structure consists of edge-sharing hexagons and pentagons; exactly 12 pentagons are required to close the cage. Both larger and smaller fullerenes are known, by adding/removing (usually pairs of) carbon atoms. These larger fullerenes are usually also approximately spherical, due to a uniform distribution of the closure pentagons, but become increasingly polyhedral as they become larger due to localised strain at the pentagons.

Carbon nanotubes are related to fullerenes, but are structurally highly anisotropic. The closure pentagons are collected (6 at each end) to form 'caps' whilst the body of the tube is formed from a seamless cylinder of graphitic hexagons. There are no fundamental limits on aspect ratio, but around 1000 is typical, and 5,000,000 is known. The interesting properties of nanotubes are largely attributed to the hexagonal body, and indeed the end caps can be removed to form open tubes. Carbon nanotubes can be subdivided into two groups: single walled carbon nanotubes (SWNTs) and multiwalled carbon nanotubes (MWNTs).

SWNTs are pure carbon tubular molecules that can be thought of as a single 'rolled up' graphene sheet. SWNTs are typically about 1-1.5 nm in diameter, and their properties depend on their diameter and the angle at which they are rolled up from the graphene sheet (the chiral angle). Multi-walled carbon nanotubes consist of several concentric layers of SWNTS. There are several techniques for the production of carbon nanotubes. However, all result in a mixture of different diameters and chiralities.

The definitions of nanotubes can be extended to include a number of variants or derivatives familiar to those skilled in the art including, for example, the presence of defects (vacancies, other rings such as heptagons, and altered via hybridisation), endohedral material (filling of the hollow core with other substances), chemical functionalisation, di(or poly) merisation, and more complex topologies.

In general, synthesis techniques for nanotubes, and their derivatives, have poor selectivity, yielding a range of products with different specific characteristics. Dimensions and intrinsic symmetry determine many of the crucial properties, such as electronic structure, and optical behaviour. Therefore, it is highly desirable to separate these polydispersed materials into pure species. The conventional strategy with small fullerenes, such as $C_{60}$, is to dissolve the crude mixture into organic solvents (usually toluene) and extract the soluble fraction which can then be separated by conventional means, such as chromatography.

The particles are aggregated by means of strong van der Waals forces that cannot be overcome by the free energy available on dissolution/dispersion. Nanocarbons are particularly challenging due to the low polarity and lack of specific other interactions. Nanocarbon materials often also contain undesirable impurities, such as micron-scale graphite, amorphous carbon, and metal catalyst particles. In addition, single-wall nanotubes themselves tend to form tightly packed bundles of typically ~50 tubes. These bundles contain tubes of similar, but not identical, diameter packed in a triagonal lattice. The bundles themselves are usually disordered, appearing like a plate of spaghetti. Arguably, the greatest challenge facing nanotube researchers at the moment is to sort out this mixture and form pure samples of specific types of SWNTS. The availability of pure (sorted or separated) nanotubes would significantly advance the field and permit the realisation of many of the suggested applications of nanotubes.

An ability to separate nanotubes into simply semi-conducting and metallic species is likely to immediately open up opportunities in many areas, including:

ITO replacement: Indium tin oxide is widely used as a transparent conducting electrode for use in displays, and photovoltaics. SWNT thin films provide a neutral coloured alternative. If metallic SWNTs can be selected, the transmission/conductivity balance is likely to be superior to ITO.

Electronic devices such as transistors, FETs, logic devices, sensors: The electronic properties and dimensions of semi-conducting single walled nanotubes suggest a route to drive forward Moore's Law in the semiconductor industry. Individual devices based on semi-conducting nanotubes have been demonstrated to be exceptionally fast and small, but are currently limited due to, for example, band-gap (radius) variability. Integrating large number of devices remains challenging, but appealing. Initial applications are developing in highly sensitive solid state sensors.

Supercapacitors: The high surface area of metallic SWNTs (every atom is on the surface) combined with their conductivity provides excellent performance as electrochemical double layer supercapacitors (exceptional capacitances greater than 200 F/g have been recorded already). Supercapacitors can radically improve the performance of portable batteries in electronics and transport applications.

Vias/interconnects in microelectronic circuitry: Due to their one-dimensional electronic structure, (ballistic condunctance) and stability, metallic single walled carbon nanotubes can carry up to four orders of magnitude greater current density than conventional metals. They are thus candidates to replace traditional metallization as circuit dimensions continue to shrink.

Heat sinks/thermal management: Individual metallic single walled carbon nanotubes have been shown to possess the highest known thermal conductance, better even than diamond.

The three vital processing steps that must be solved for the realisation of the potential of SWNTS are:
to remove the catalyst particles and other carbon particles from the mix of products to leave pure SWNTS.

to sort the nanotubes into their different types. More specifically, nanotubes need to be sorted either into specific chiralities and diameters or a broader separation of carbon nanotubes into either semi-conducting or metallic tubes.

to align of nanotubes into ordered arrays of specific types of tube.

Current approaches towards all of these aims start with obtaining a solution of SWNTs. SWNTs are very stubbornly insoluble in nearly all solvents and this presents a real problem for their manipulation. It is necessary to isolate the individual tubes from each other by breaking up the bundles of nanotubes. This step is difficult because, as noted above, SWNTs form complicated stacked and entangled networks which are held together as a consequence of strong van der Waals forces. The simplest approach is to sonicate the SWNTs in organic solvent. This technique employs ultrasonication to break apart the bundles, which is damaging to the nanotubes themselves. The resulting solutions are also of very low concentration (<10 micrograms/ml) if individual nanotubes rather than bundles are present, even after lengthy centrifugation (Coleman et al Adv. Mater 2008, 20, 1876-1881). Such concentrations are too low for practical purposes. Alternative techniques are therefore required.

The most commonly used method of SWNT dissolution is to surfactant wrap nanotubes as described in O'Connell et al., Science 297, 593 (2002). Again damaging sonication is used, and concentrations of stable suspensions are low (typically <1 mg/ml). Many related methods, use a range of direct covalent functionalisation chemistry to stabilise the nanotubes, following sonication. Although chemical modification is useful in certain circumstances, it is known to damage the intrinsic properties of nanotubes (Chen et al., Science 282. 95 (1998).

Essentially, all of these methods use damaging chemical functionalisation, sonication and/or strong oxidation (Tasis at al. Chem. Eur. J., 9(17), 4000, (2003)).

Another method is to use the extreme nature superacids to protonate the tubes to form positively-charged SWNTs which permits dissolution and a degree of ordering. This method is described in, for example, L. M. Ericson, et al, Science, 2004 and produces encouraging results. However, the acid is dangerous, difficult to handle, and likely damages the tubes.

The use of metal/liquid ammonia solutions to dissolve small fullerenes, such as $C_{60}$, is described in Howard C A et al, J. Am. Chem. Soc., 126, 13228, (2004). However, such a technique would not be expected to be useful for nanotubes as small fullerenes, which dissolve in organic solvents, do not form the extended and entangled networks formed by nanotubes.

Penicaud et al. describe the use of a charging mechanism to disperse nanotubes. The nanotubes are reduced with Na or Li and dissolved in a polar aprotic solvent, such as THF. Standard organic solvents are less favourable than ammonia/amines for this process as they do not solvate electrons or metal cations efficiently. As a result, Penicaud et al. must use a transfer agent, sodium napthalate, which contaminates the material. In addition, the solubility limit of the resulting anions is lower.

Others have used metal/ammonia systems for carrying out functionalisation chemistry on nanotubes as described in Liang et al., Nano Letters, 2004, 4 (7), 1257-1260. However, the goal of these studies is not dispersion or separation, but rather chemical modification. In fact, the conditions used in existing ammonia studies are poorly adapted for dispersion/separation purposes, as excess metal is used. Excessive metal washes out the possibility of selective charging, and prevents dispersion by screening the electrostatic repulsions between the carbon species, leading to so-called 'salting-out'.

As described above, once a solution has been generated, it is desirable to be able to separate out SWNTs having different properties, e.g. separate metallic SWNTs from semi-conducting SWNTs. While some progress has been made in this regard, current techniques, based on (di)electrophoresis, DNA wrapping, and relative reactivity are expensive, only partially successful, and operate at only <<1 mg scale. Such techniques are described in Krupke R et al, Science, 300, 2018, (2003); Zheng M et al., Science, 302, 1545, (2003); Strano et al., Science, 301, 1519, (2003) and Howard et al, Nature Nanotechnology 1, 60-65 (2006).

Hence there is a need for a simple yet effective method for producing a solution comprising a high concentration of individual nanotubes, in particular SWNTs, from which it is possible to separate nanotubes having differing properties.

In this regard, the present invention provides a method for dispersing nanotubes without damage, thus providing a means to obtain purified, monodispersed, nanoscale carbon species.

More specifically, the present invention provides a method for dispersing nanotubes comprising contacting the nanotubes with an electronic liquid comprising a metal and an amine solvent.

Advantageously, the present inventors have surprisingly found that an electronic liquid can be used to disperse complex bundles of nanotubes into individual nanotubes, in particular SWNTs. This method is particularly advantageous because it avoids the use of agents which damage the nanotubes such that the nanotubes in the resulting solution are non-damaged and non-functionalised. Thus, an ideal starting material, in high concentration, is provided for further manipulation, such as separation and functionalisation.

A further advantage of the method of the present invention is the cleanliness of the process. More specifically, only metal and amine solvent are added, and the solvents are highly volatile and easily removed, leaving the pure metal nanotubide salts. Many of the metals themselves are volatile and can be removed by sublimation. This means that the metal can thus be recovered for reuse, leaving clean, dispersed, individual nanotubes.

In a further aspect, the present invention provides a solution of dispersed nanotubes, comprising individual, charged nanotubes at a concentration of about 0.1 mgml$^{-1}$ or more and a solvent. It has not previously been possible to obtain solutions having such a high concentration of nanotubes. A high concentration is desirable for further manipulation.

In a further aspect, the present invention provides a nanotube crystal comprising a close packed array of nanotubes, wherein the crystal has a thickness of 100 nm or more. The inventors have surprisingly found that by employing the method as described herein, it is possible to obtain a previously unprecedented nanotube crystal which exhibits long range order.

In the method of the present invention, the nanotubes are contacted with an electronic liquid. This step has the effect of charging the carbon species in question, to generate nanotube anions.

The term "electronic liquid" is used herein to describe the liquids which are formed when a metal, such as an alkaline earth metal or an alkali metal, for example, sodium, dissolves without chemical reaction into a polar solvent—the prototypical example being ammonia. This process releases electrons into the solvent forming a highly reducing solution. Without wishing to be bound by theory, these solutions dissolve nanotubes, based on two factors. First, the electron of the carbon species means that they form negatively charged anions. Second, these negatively charged anions are stably dispersed due to electrostatic repulsion.

One fundamental impediment to SWNT applications that has been overcome by the present invention is the need for dispersion into individual nanotubes rather than the usual bundles which form entangled networks. Electron charging in an amine, such as ammonia is a powerful approach because electrostatic repulsion separates the bundles. Advantageously, amines, such as ammonia, have the ability to solvate both the anions and cations, in contrast to protonation using superacids and reduction via sodium naphthalide. The material may be separated into constituent species either by selective charging or selective discharging, fundamentally enabled by the different electronic structures of the different species.

The nanotubes used in the present invention may be SWNTs or MWNTs. Preferably, the nanotubes are carbon nanotubes. The nanotubes may have a range of diameters. Typically, for SWNTs, the nanotubes will have diameters in the range from about 0.4 to about 3 nm. Where the nanotubes are MWNTs, the diameters will preferably be in the range from about 1.4 to about 100 nm. Preferably, the carbon nanotubes are SWNTs. Suitable nanotubes can be obtained commercially from SWeNT, Carbon Nanotechnologies Inc., Carbolex Inc. and Thomas Swan Ltd.

The metal used in the method of the present invention is a metal which dissolves in an amine to form an electronic liquid. The person skilled in the art will be familiar with appropriate metals. Preferably, the metal is selected from the group consisting of alkali metals and alkaline earth metals. Preferably, the metal is an alkali metal, in particular, lithium, sodium or potassium. Preferably, the metal is sodium.

It is advantageous to control carefully the amount of metal included in the solution. Too much metal present in the electronic liquid washes out (saturates) the possibility of selective charging and prevents dispersion of the nanotubes by screening the electrostatic repulsions between the carbon species. Therefore, preferably the metal is present in an amount such that the ratio of metal atoms in the electronic liquid to carbon atoms in the carbon nanotubes with which the electronic liquid is contacted is about 1:4 or less, preferably about 1:6 or less, preferably about 1:8 or less, preferably about 1:10 or less, preferably about 1:15 or less, preferably about 1:20 or less. In some embodiments, the metal is present in an amount such that the ratio of metal atoms in the electronic liquid to carbon atoms in the carbon nanotubes with which the electronic liquid is contacted is in the range from about 1:3 to about 1:10, about 1:3 to about 1:8, about 1:3 to about 1:6, about 1:3 to about 1:5, preferably about 1:4. The molar ratio of metal to carbon atoms can be determined from their relative masses by simple calculations with which the person skilled in the art will be familiar.

In the method of the present invention, an electronic liquid is formed by dissolving the metal in an amine solvent. In some embodiments, the amine solvent may be a $C_1$ to $C_{12}$ amine, a $C_1$ to $C_{10}$ amine, a $C_1$ to $C_8$ amine, a $C_1$ to $C_6$ amine, a $C_1$ to $C_4$ amine. The amine solvent is preferably selected from ammonia, methylamine or ethylamine. Preferably the amine solvent is ammonia.

In one embodiment, the metal is sodium and the amine solvent is ammonia.

The product of the method of the present invention is a solution of dispersed individual nanotubes. As a consequence of the method of dispersion, the individual nanotubes will be charged. The person skilled in the art will be familiar with techniques which may be used to confirm the presence of individualised (debundled) nanotubes. An example of a suitable technique is small angle neutron scattering (SANS). Details of the SANS technique are described in Fagan et al., J Phys Chem B., (2006), 110, 23801.

SANS is a powerful technique for probing the structure of SWNTs in solution. More specifically, SANS can be used to determine whether the SWNTs are present as isolated species or in bundles or clusters. SANS provides information of the structure of large particles in solution (in the range from 1 to 1000 nm). The SANS intensity I(Q) is proportional to $Q^{-D}$, where D is the fractal dimension of the tube. Thus, the expected SANS pattern for fully dispersed rod-like objects (i.e. $D^{-1}$ behaviour). Otherwise, non-mono-dispersions of SWNTs, i.e. those consisting of aggregates or networks of rods exhibit a larger fractal dimensions, typically from 2 to 4.

It has been found that, where the method of the present invention is employed, it is possible to obtain surprisingly high concentrations of nanotubes. More specifically, prior to the present invention it was believed that, due to thermal equilibrium being reached, the highest concentration of individual nanotubes which could be obtained in solution is 0.01 mgml$^{-1}$. However, the present inventors have achieved concentrations of greater than about 0.01 mgml$^{-1}$. Preferably the concentration of individual nanotubes is about 0.1 mgml$^{-1}$ or more, about 0.5 mgml$^{-1}$ or more, about 1 mgml$^{-1}$ or more, about 5 mgml$^{-1}$ or more, about 10 mgml$^{-1}$ or more, about 50 mgml$^{-1}$ or more, about 100 mgml$^{-1}$ or more.

A further advantage associated with the present invention is that selectivity is achieved. More specifically, the nature of the separation method is such that metallic carbon nanotubes are charged in preference to semi-conducting nanotubes. The effect is due to the variable electron affinity of SWNTs which depends on type, diameter, and helicity.

The types of nanotubes which are present in the solution can be determined by Raman scattering techniques (Desselhaus et al Physics Reports (2005), 40A). Raman scattering is a powerful technique for the determination of specific types of SWNT present in a sample consisting of mixed tubes. Raman scattering is the process of inelastic light scattering via an intermediate electron with energy lost or gained from a vibronic mode (phonon) of the sample. As only a very few photons are scattered in this way (1 in $10^7$), Raman spectroscopy therefore typically uses a laser for a high intensity beam of monochromatic light.

SWNTs are rolled up sheets of graphite and due to this tubular nature their electrons are confined in the radial direction of the tube. This quantisation leads to large spikes, called van Hove singularities, in their electronic Density of States (eDOS). If the incoming light matches the difference between these spikes, the Raman scattering is resonant. The Raman spectrum at any given wavelength is then dominated by the specific tubes which have transitions matching that wavelength in their eDOS. To predict which tubes will be in resonance with the light, a Kataura plot is often used. This graph is a plot of calculations of the transitions of different SWNTs as a function of their diameter.

Below 400 cm$^{-1}$, the Raman spectra of SWNTs are dominated by the Radial Breathing Modes (RBM). The energy of this phonon is inversely proportional to the diameter of the SWNT. The Raman spectra of a sample of a mixture of tubes will show a sum of the peaks from all the RBMs from the SWNTs that are resonant with the light. Therefore, knowing the laser wavelength, one can read off from the Kataura plot which tubes are present in a given sample. If one takes a sample of SWNTs and processes it chemically, then by comparing its Raman spectrum with that of the untreated tubes, the relative population increase or decrease in the RBMs provides strong evidence of the relative increase or decrease of the specific type of SWNT in the sample. Furthermore, as can be seen in the plot, transitions from metallic and semiconducting tubes are typically well separated for given energies. Thus, typically a spectrum contains reasonably clear regions of peaks corresponding to metallic and semiconducting SWNTs. In this way Raman Spectroscopy is a powerful technique in determining the extent of separation of SWNTs based on electronic character. Jorio A., New J. Phys., (2003), 5, 139 describes the use of this technique for characterising carbon nanotubes.

After producing a solution of dispersed individual nanotubes, one or more further steps may be carried out. In particular, the dispersion of individual nanotubes may be separated on the basis of diameter, structure, helicity and/or electronic character.

In one case, the dispersed material(s) may be separated by gradual quenching of the charge using a suitable quenching agent, including but not limited to $O_2$, $H_2O$, $I_2$, and alcohols (or other protic species). As the quenching agent is added, the species with the highest energy electrons will be deposited first. By adding appropriate stoichiometric quantities, the desired fractions may be separated. For example, the fractions precipitated after neutralising predetermined amounts of the total charge may be collected.

Alternatively or in addition to chemical quenching, an electrochemical quenching method may be used. In this case the addition charge on the individual nanotube-based anions is removed by applying a voltage to an (otherwise inert) electrode placed in the dispersion of nanotubes.

By controlling the potential of the electrode, nanotubes of different electron affinities can be oxidised and precipitated onto the electrode. The electrode (or series) of working electrodes may be held at fixed potential(s), in potentiostatic mode. A counter electrode may also be provided, preferably in a remote, though ionically-linked compartment, at which the metal ion is reduced and recovered. A reference electrode may be used to control the potential at the working electrode accurately.

Alternately, or in an additional step, the solvent may gradually be removed, causing the heaviest/least charged species to deposit first. These two mechanisms allow separation by, for example, nanotube length on the one hand, and nanotube electronic character (semiconducting band gap) on the other.

Optionally, quenching agents, including but not limited to RI, wherein R is a hydrocarbon group can be used to chemically modify the carbon species. By carrying out the reaction on dispersions of individual nanotubes, an ideally uniform functionalisation is achieved over the nanotube surface as typical functionalisations occur only on the surface of nanotube bundles.

Optionally, a solution of (previously separated) carbon species can be destabilised slowly (by quenching or solvent removal) to crystallise the carbon species.

Alternatively or in addition, the individualised, dispersed nanotubes, may be further separated according to size by chomatrography in a dry environment.

Optionally, the charged individual nanotubes can be transferred to other dry organic solvents, such as dimethyl formamide (DMF), dimethylacetamide (DMA) and N-methylpyrolidone (NMP), for further processing.

The primary products of this process are monodispersed, undamaged, nanocarbons or nanocarbon salts, which are not contaminated with organic or other material.

In one embodiment, the dispersed nanotubes may be quenched, preferably electrochemically to produce a nanotube crystal comprising a close packed array of nanotubes, wherein the crystal has a thickness of about 100 nm or more. This is particularly surprising as such crystalline structures have not been obtained previously. In some embodiments, the crystal has a thickness of about 150 nm or more, about 200 nm or more, about 500 nm or more, about 750 nm or more, about 1 µm or more.

Where reference is made herein to the thickness of the crystal, it refers to the dimension of the crystal in a direction perpendicular to the axes of nanotubes of the close packed array of nanotubes from which it is formed.

The method of the present invention provides a product which is a very useful starting material for further manipulation of carbon nanotubes. Once separated, monodispersed solutions of carbon species can be made that are particularly suitable for forming ordered complex fluids. For example a solution of dispersed individual carbon nanotubes can be produced at a concentration suitable for the formation of a nematic phase, which is desirable for alignment of nanotubes, or other further processing, including crystallisation.

The present invention will now be described further by reference to the following figures and examples which are in no way intended to limit the scope of the invention.

EXAMPLE 1

Single Walled Carbon Nanotubes (SWNTs) were obtained in 'as produced' grade obtained from Carbolex, Inc., USA and were heated at to a temperature in the range 180° C. to 220° C. and preferably around 200° C. under a dynamic vacuum for 24 hours to remove adsorbed species. The nanotubes were then loaded in a specially designed clean cell, along with sodium metal in an Argon glovebox ($O_2$ and $H_2O<1$ ppm) such that there was a stoichiometric ratio of one sodium atom to every 30 carbon atoms. This was connected to a stainless steel, leak tight gas rig and cooled to approximately −50° C. Following this, high purity anhydrous ammonia was condensed onto the sample. Immediately, the solution forms a deep blue colour which can attributed to solvated electrons present due to the dissolution of sodium metal in the ammonia (Wasse et al.). After a period of about an hour, the solution clears (i.e. the blue colour of the solution disappears) which is indicative of the transfer of the solvated electrons to the SWNT structure (i.e. these electrons are 'picked up' by the nanotubes). The more readily reduced nanotubes then slowly dissolve and the solution becomes a brown/black colour. The dissolved fraction is then poured into a separate chamber in the cell and the ammonia is removed.

Figure 3:
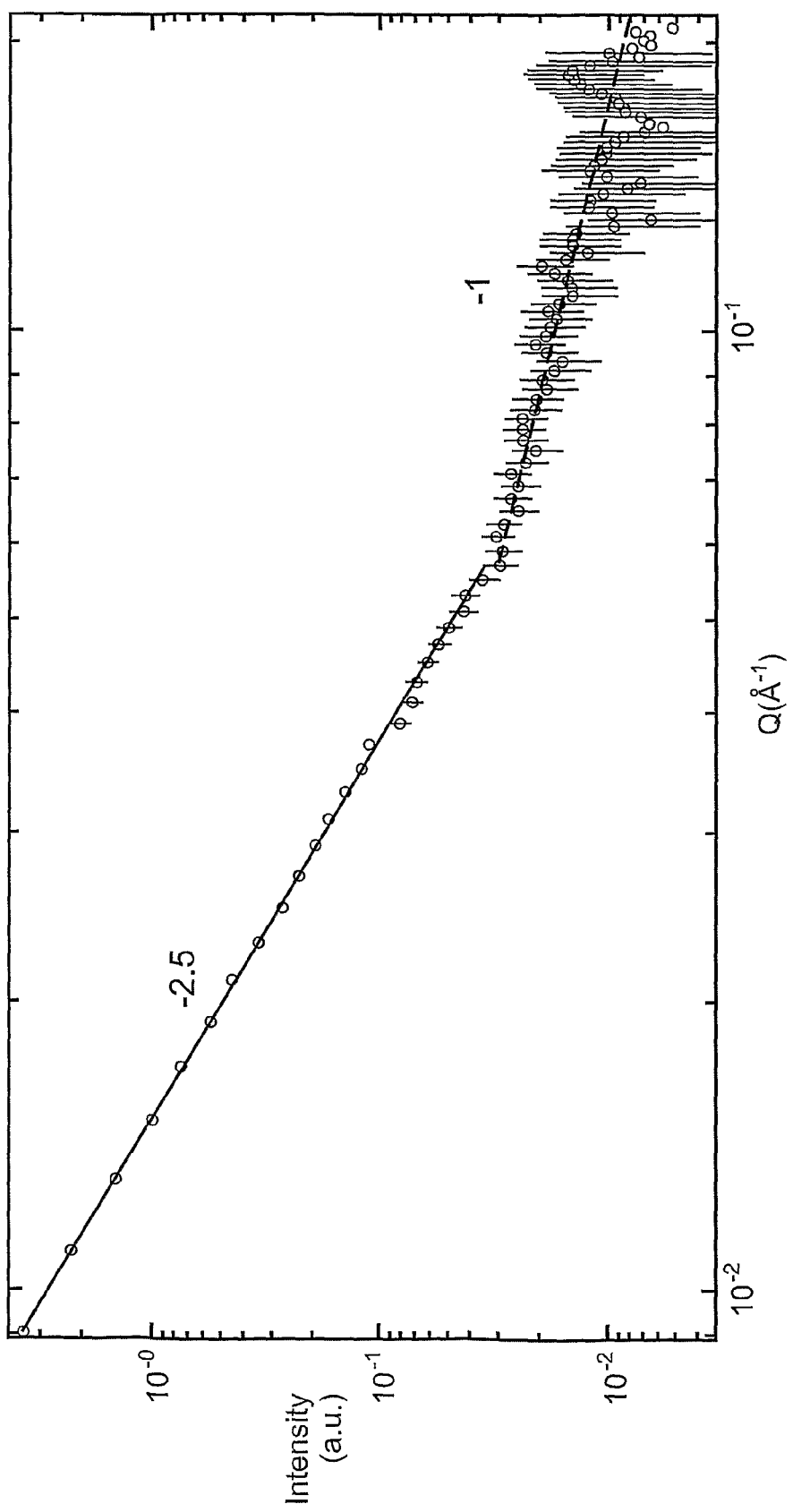
FIG. 3 is a plot of SANS intensity as a function of scattered wavelength for a solution of spontaneously dissolved SWNTs in sodium ammonia solution at 230 K, using Carbolex As Produced (AP) SWNTs as a starting material.

The solution of SWNTs was analysed by SANS and the results are illustrated in FIG. 3.

Figure 4:
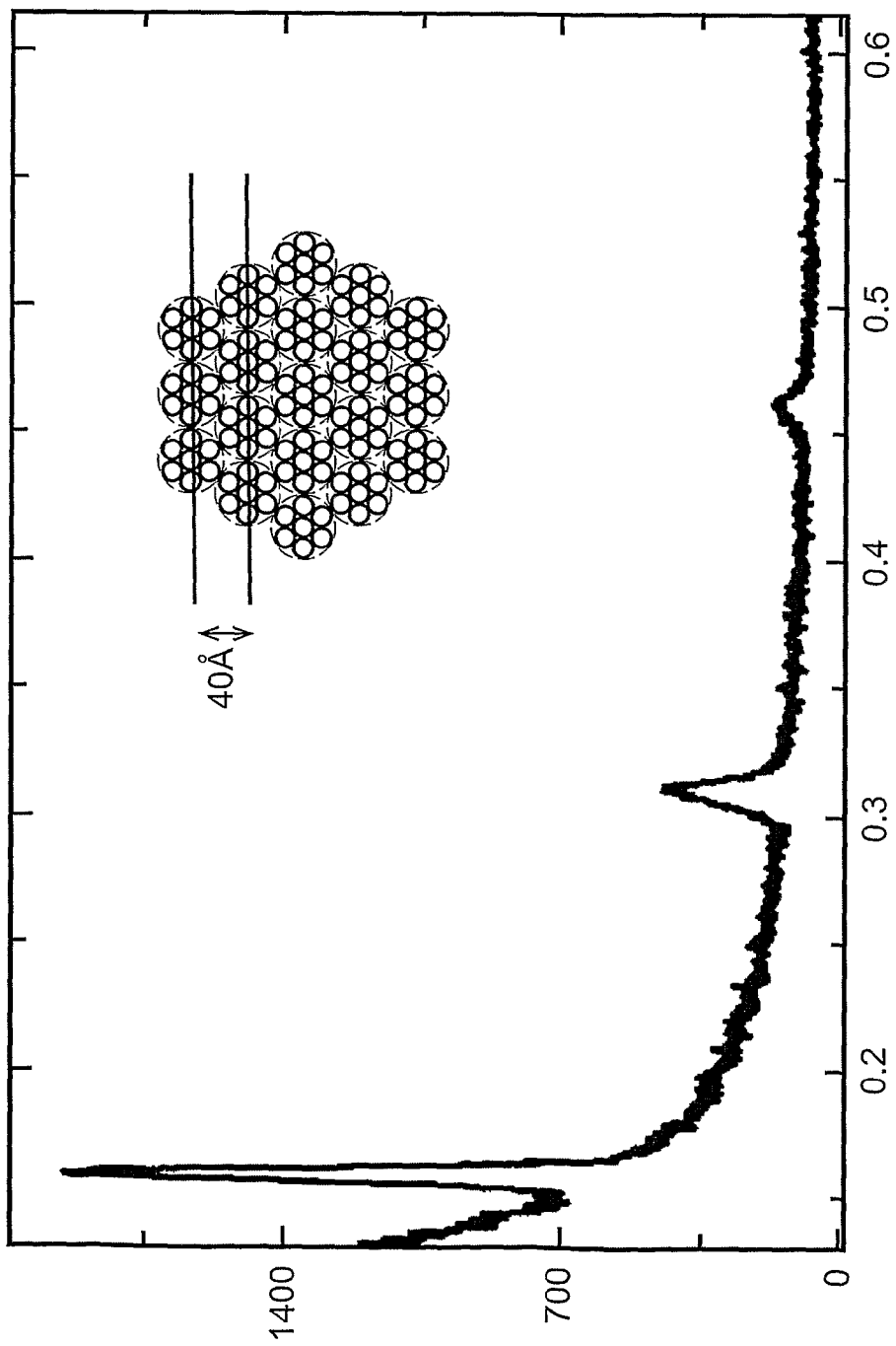
FIG. 4 is a diffraction pattern of a deposited film of separated Carbolex AP nanotubes.

Without exposure to air, the resulting charged nanotubes are dispersed in acetone to permit room temperature manipulation. From this more dilute solution containing positively charged sodium anions and negatively charged SWNTs, a film is deposited onto gold electrodes using a weak electric field of approximately 1 Vcm$^{-1}$. This permits the removal of the sodium cations and the deposition of the SWNTs anions onto films of SWNTs. FIG. 4 shows an Xray diffraction pattern from this deposited film.

Arc produced SWNTs typically contain shorter tubes which have small diameter range. Although this decrease in length means that the tubes will form stable solutions on a shorter time scale (longer tubes will take much longer to diffuse into solution), their particular diameter range means that determining any large change in the species of tubes present is difficult, especially determining the metal to semiconducting ratio. For this reason, CoMoCat SWNTs were used for the Raman/UVVis experiments.

CoMoCat tubes SWeNT Inc were processed as above. After the solution became colourless, i.e. after the electrons were transferred to the nanotubes, the ammonia was slowly removed. The nanotube salt was then transferred in rigorously dry conditions to another dry solvent, typically DMF. The tubes were left to dissolve over a period of several days until a homogenous brown/black solution was formed. The dissolved fraction was removed and the SWNTs precipitated out by quenching in air.

Figure 1:
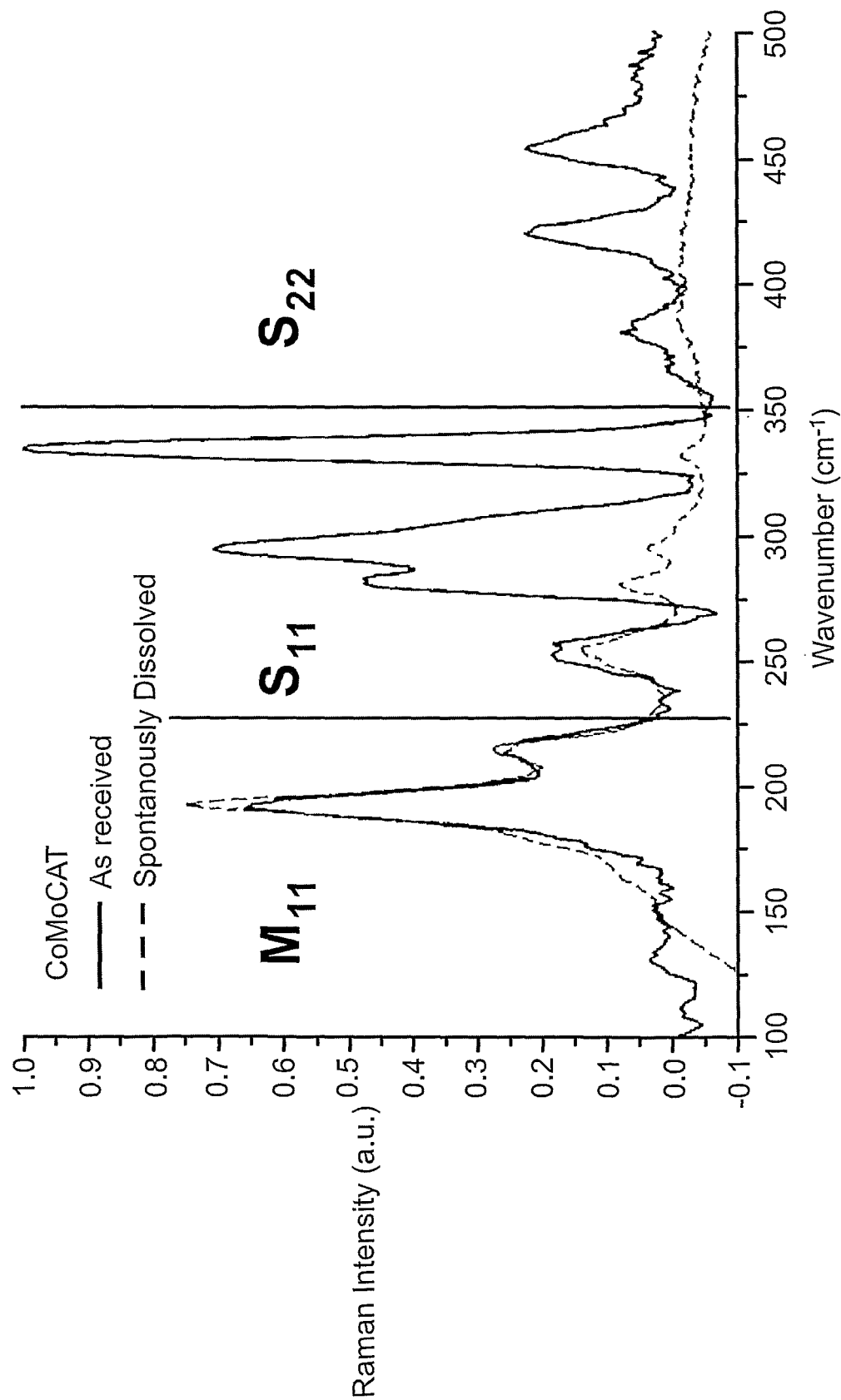
FIG. 1 is a Raman spectrum measured at 633 nm which illustrates the radial breathing modes of the carbon nanotubes and shows an enrichment of metallic SWNTs in the spontaneously dissolved fraction, using CoMoCat tubes as a starting material.

FIG. 1 shows the radial breathing modes of the SWNTs and the distribution of the nanotubes can be established from these features in the Raman spectra of SWNTs. The presence of these features is strong evidence for the existence of SWNTs and the various RBM peaks represent populations of specific types of nanotubes. The position of the breathing mode is inversely related to the diameter of the SWNTs (Dresselhaus et al, Phys. Rep 409, 47, (2005)). As a comparison, FIG. 1 shows Raman spectra from the as received starting material as well as the 'spontaneously dissolved' SWNTs—the SWNTs that were dispersed in solution and were subsequently removed. The areas in the spectra which correspond to metallic and semiconducting tubes are marked. The spectra show a clear enrichment of metallic SWNTs in the processed sample with respect to the as received sample. This result was repeated in the majority of areas of the processed sample.

Figure 2:
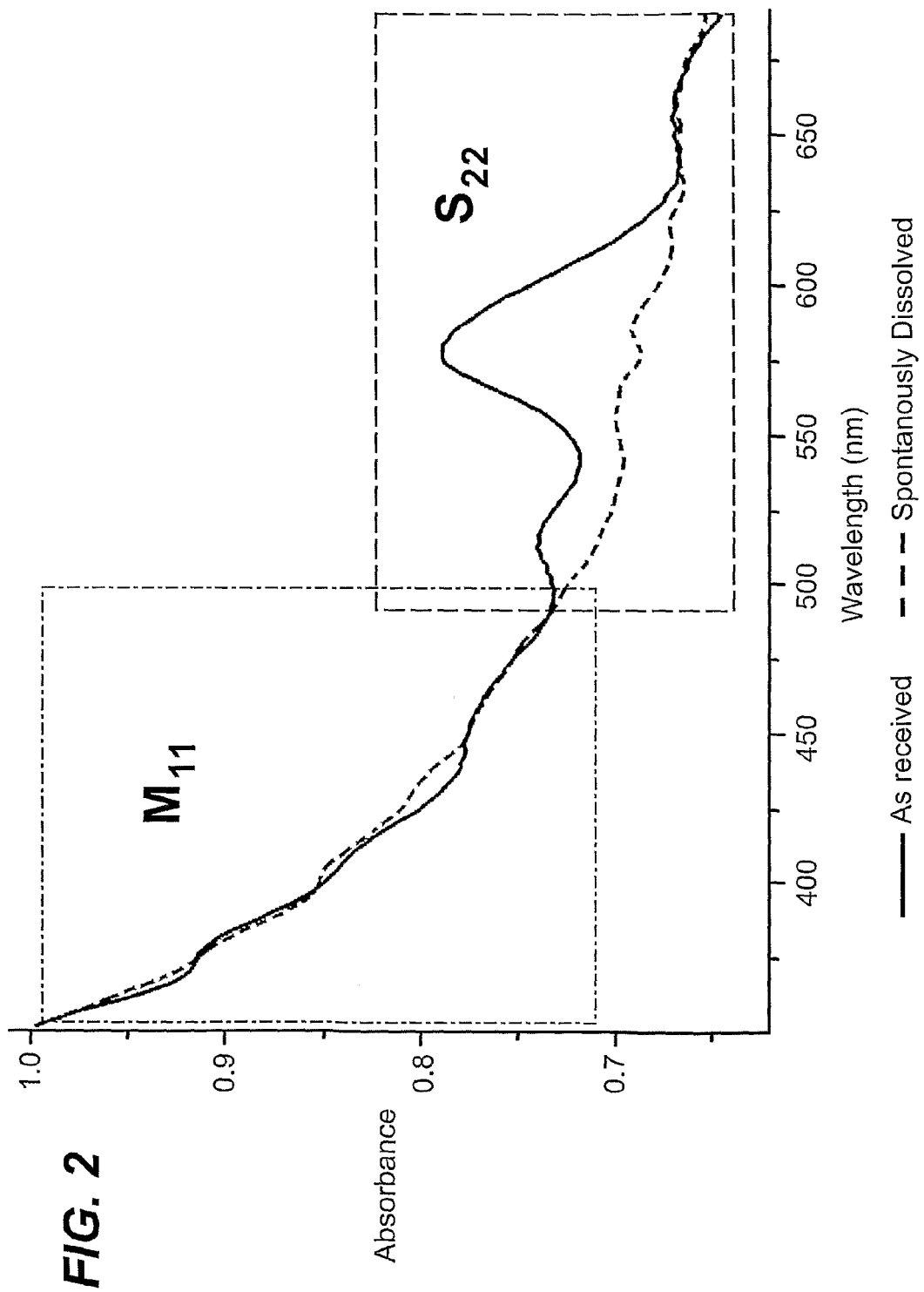
FIG. 2 is a UV/VIS spectrum which illustrates the depletion in semi-conducting peaks in the spontaneously dissolved fraction; using CoMoCat tubes as a starting material

Furthermore, FIG. 2 (UV/VIS spectroscopy) shows the depletion of semiconducting peaks in the spontaneously dissolved fraction and from these two figures it is apparent that the availability of the conductance band above the Fermi level accounts for the preferential reduction and dissolution of the metallic SWNTs.

There are two main factors in determining the selectivity of nanotubes via this method: 1) the electron affinity which depends on the electronic structure of the particular SWNT and 2) the enthalpy of solvation of the individual SWNT once the nanotubes are in solution. Each SWNT will have a specific value for electron affinity and will become reduced and dissolve in order. This process is somewhat analogous to the charging and hence dissolution of $C_{60}$ in metal-ammonia solution—there is a step-like reduction and hence a allowing the sequential dissolution. This result points towards the complete selectivity via incremental dissolution of different nanotubes.

FIG. 3 shows SANS data from a solution of SWNTs (Arc-grown SWNTs from Carbolex, AP grade) dissolved in sodium ammonia solution as described above. The SANS experiment was performed on the instrument LOQ at ISIS spallation neutron source at the Rutherford Appleton Lab, UK. These data show two distinct scattering behaviours, one with a $Q^{-1}$ dependence, indicating isolated rods which persists down to $Q=0.2$ Å$^{-1}$ which is a length scale of dimension down to 3 nm—the limit of the instrument. This is approximately the size expected from a solvated SWNT. The $Q^{-2.5}$ behaviour indicates that there is also larger dimensioned material in the solution.

As-produced arc tubes contain carbonaceous materials such as disordered carbon and graphite fragments and it is possible that they are also dissolving. The cross-over is thought to originate from the smallest size of the larger scatterer (i.e. the particles responsible for the $Q^{-2.5}$ behaviour). Another explanation of the $Q^{-2.5}$ behaviour is given in Lough et al., Nano Letters, 2006, 6(2), 313 on concentrated SWNT solutions. This paper shows that above a given concentration of SWNTs, due to the length of the tubes, even though they are dispersed, there is an unavoidable mesh formed due to contact between the solvated nanotubes. This is the cause of the higher power law scattering at lower Q for highly concentrated solutions of nanotubes. The paper goes on to show that the $Q^{-1}$ dependence is lost completely when the quality of the dispersion is reduced.

The SANS data provides strong evidence that solutions of SWNTs in electronic liquids are monodispersed from the clear presence of $Q^{-1}$ dependence of the scatterers. The $Q^{-2.5}$ dependence also seen is thought to be either due to contacts between the isolated rods in the concentrated solution formed or larger dimensioned and sized carboneous materials which are also present in the raw tubes.

FIG. 4 shows an X-ray diffraction pattern of a film of SWNTs deposited from solution as described above. The three main peaks are found at Q=0.16, 0.31 and 0.46 Å$^{-1}$. This is indicative of long range order with a repeat of ~40 Å, with the latter two peaks the $2^{nd}$ and $3^{rd}$ order reflections of the first peak. These features are completely absent in X-ray scans of the as received tubes. These data can be explained by the model, also shown in FIG. 4, and described in Sun, C. H. et al. *App. Phys. Lett.* 86, 203106, (2005), a theoretical paper suggesting possible arrangement of nanotubes in a uniform crystal. In as produced samples, nanotubes are found in bundles containing in the order of 50-100 tubes. These bundles contain a mixture of similar but not identical diameter SWNT. Due to the polydispersity of these bundles X-ray diffraction patterns typically show a broad feature relating to the average intertube distance (Rols, S. et al., *Eur. Phys. J. B*, 10, 263 (1999)) and absolutely no longer range order. If the model used here to explain the diffraction pattern is correct, this is strong evidence that within the film there are areas of SWNTs that have been enriched to a level where they can be closed packed in a large solid array which is an unprecedented nanotube crystal. The diameter of the SWNTs in the highly enriched region would then be ~12 Å having taken into account the distance between the tubes to be ~3.4 Å. An estimate of the thickness of the crystallites can be made using the Scherrer Equation (The Scherrer Formula for X-Ray Particle Size Determination, A. L. Patterson *Phys. Rev.* 56 (10): 978-982 (1939)), from the width of the diffraction peak. This yields a value of ~110 nm i.e. containing of the order of 5000 SWNTs of diameter 12 Å (taking into account the distance between the nanotubes). This model for estimating the crystal size provides a lower bound of the actual size as some of the broadening may be due to other effects, for example, relating to the instrumentation or to variations in nanotube size. Thus, the actual crystal size may be larger.

The invention claimed is:
1. A method for dispersing carbon nanotubes, comprising contacting the nanotubes with an electronic liquid comprising a metal, and an amine solvent,
  wherein the contacting is performed under such conditions that a solution of individual carbon nanotubes is produced, and wherein the metal is included in the electronic liquid in an amount such that the ratio of metal atoms in the electronic liquid to carbon atoms in the carbon nanotubes with which the electronic liquid is contacted is about 1:6 or less.

2. The method according to claim 1, wherein the carbon nanotubes are single walled carbon nanotubes.

3. The method according to claim 1, wherein the carbon nanotubes in the solution are non-damaged and non-functionalized.

4. The method of claim 1, wherein the metal is selected from the group consisting of alkali metals and alkaline earth metals and wherein the amine solvent comprises ammonia, methylamine or ethylamine.

5. The method according to claim 1, wherein the metal is an alkali metal.

6. The method according to claim 1, wherein the amine is ammonia.

7. The method according to claim 1, wherein the concentration of separated individual nanotubes in the solution of carbon nanotubes formed by the method is about 0.1 mg/ml or more.

8. The method according to claim 1, further comprising separating the dispersed carbon nanotubes.

9. The method according to claim 8, wherein the dispersed carbon nanotubes are separated on the basis of electronic character.

10. The method according to claim 8, wherein the dispersed carbon nanotubes are separated on the basis of helicity.

11. The method according to claim 8, wherein the dispersed carbon nanotubes are separated by controlling the ratio of metal atoms in the electronic liquid to carbon atoms in the carbon nanotubes with which the electronic liquid is contacted.

12. The method according to claim 8, wherein the dispersed carbon nanotubes are separated on the basis of size.

13. The method according to claim 12, wherein the dispersed carbon nanotubes are separated by chromatographic techniques.

14. The method according to claim 8, wherein the dispersed carbon nanotubes are selectively quenched.

15. The method according to claim 14, wherein the dispersed carbon nanotubes are separated by adding a quenching agent.

16. The method according to claim 15, wherein the quenching agent is selected from the group consisting of oxygen, water, alcohols, protic organic solvents, and a halogen.

17. The method according to claim 16, wherein the quenching agent comprises iodine.

18. The method according to claim 8, wherein the dispersed carbon nanotubes are quenched electrochemically.

19. The method according to claim 1, further comprising transferring the dispersed carbon nanotubes to a solvent.

20. The method according to claim 19, wherein the solvent is a dry organic solvent.

21. The method according to claim 20, wherein the solvent is dimethylformamide or N-methylpyrolidone.

* * * * *